United States Patent [19]

Rozendaal

[11] Patent Number: 5,607,280
[45] Date of Patent: Mar. 4, 1997

[54] APPARATUS FOR LOADING PIPE ONTO A MACHINE

[75] Inventor: Peter C. Rozendaal, Pella, Iowa

[73] Assignee: Vermeer Manufacturing Company, Pella, Iowa

[21] Appl. No.: 567,926

[22] Filed: Dec. 6, 1995

[51] Int. Cl.⁶ .................................................. B65G 57/18
[52] U.S. Cl. .................. 414/745.7; 414/786; 414/795.2; 414/933
[58] Field of Search .......................... 414/746.1, 746.4, 414/795.2, 797.9, 933, 786; 198/547, 549

[56] References Cited

FOREIGN PATENT DOCUMENTS

| 2745858 | 4/1979 | Germany | 414/797.9 |
|---|---|---|---|
| 1602686 | 10/1990 | U.S.S.R. | 414/746.4 |

OTHER PUBLICATIONS

Brochure of StraightLine Manufacturing, Inc. for DirectLine DL605, Aug. 1, 1994.
U. S. Ser. No. 08/438,696, May 1995, Rosendaal.
Brochure of StraightLine Manufacturing, Inc. for DirectLine DL1510, Jul. 15, 1994.
Brochure of StraightLine Manufacturing, Inc. for DirectLine DL4010, Dec. 5, 1994.
Technical Report DirectLine 4010 of StraighLine Manufacturing, Inc. (dated Oct. 10, 1994).
Brochure of Ditch Witch JT 2320 Directional Boring System (dated March, 1995).

*Primary Examiner*—Karen B. Merritt
*Assistant Examiner*—Janice L. Krizek
*Attorney, Agent, or Firm*—Merchant, Gould, Smith, Edell, Welter & Schmidt

[57] ABSTRACT

An underground boring machine including an automatic pipe loading apparatus. A plurality of pipes are gravity fed through a discharge opening at a lower end of a magazine combining several columns of pipe. A selection member has a plurality of pipe receiving pockets, equal in number to the columns present in the magazine. The selection member can be in one of a first position wherein a first pipe receiving pocket is aligned with a first column or a second position wherein the first pipe receiving pocket is moved towards the machine. A pick-and-place lever arm picks a pipe from the first pipe receiving pocket and transports the pipe towards the machine. Lift-up arms selectively support the pipes within the magazine.

16 Claims, 14 Drawing Sheets

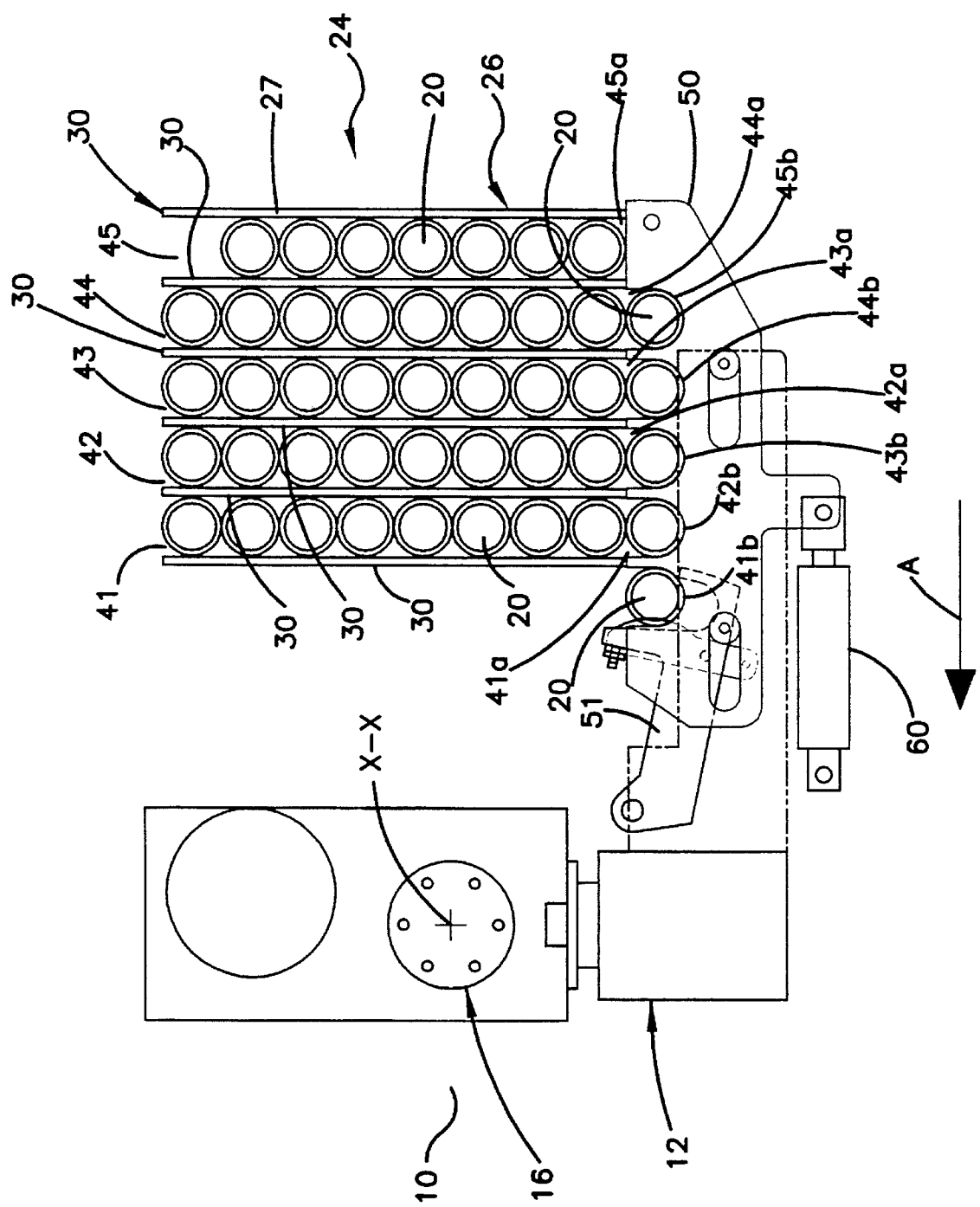

APPARATUS FOR LOADING PIPE ONTO A MACHINE

BACKGROUND OF THE INVENTION

1. Field of the Invention

This invention pertains to devices for loading pipe onto a machine having a pipe receiving location. More particularly, this invention pertains to an automatic pipe loading apparatus for an underground boring machine.

2. Description of the Prior Art

In the prior art, machines exist requiring periodic placement of pipe on the machine. An example of such is an underground directional boring machine which forces a length of pipe through the ground in order to form a bore. After the bore is formed., a cable or the like may be passed through the bore. Such underground boring machines eliminate the need to dig a long trench into which a cable is then laid.

In underground boring machines, a fixed length of pipe is placed on a machine and then forced into the ground. After the full length of the pipe has been forced into the ground, a subsequent length of pipe is placed on the machine and coupled to the first length. The combined length is then further forced into the ground. A third length of pipe is then placed on the machine and coupled to the second length. In order to form a complete bore, numerous lengths of pipe must be placed on the machine.

Pipes used in directional boring machines come in a variety of lengths and weights. For example, in the directional boring industry, 10 foot long pipes weighing about 70 pounds each are frequently used. Fifteen foot pipes weighing from 100–150 pounds each are also used.

In the prior art, a load of pipe is delivered to the work site and a worker must pick up each individual pipe and manually place it on the boring machine. It will be appreciated that where substantial lengths of pipe are required, an individual worker must lift and place a substantial number of heavy pipes. Indeed, for 15 foot pipes, two workers may be necessary to load and place a single pipe. It is therefore desirable to automate loading of pipe and eliminate the need for a worker to lift and place substantial numbers of heavy pipes.

Automatic pipe loading machines exist in the prior art. One such example is shown in commonly assigned and copending U.S. patent application Ser. No. 08/438,696. However, the automatic pipe loading machines in the prior art do not cycle the pipes used in the machine. Because some pipes are used more frequently than others, the pipes wear unequally. Therefore, it is desirable to have an automatic pipe loading machine that will cycle the usage of the pipes to insure that the pipes wear equally.

SUMMARY OF THE INVENTION

According to a preferred embodiment, the present invention provides an automatic loading device for pipe. The invention comprises an apparatus for loading pipe onto a machine having a pipe receiving location. The pipe loading apparatus has a magazine or source containing a plurality of pipes disposed in a plurality of columns wherein a pipe can be discharged from the lower end of each column. The first column of pipes is in close proximity to a pipe receiving location. The end column of pipes is on a side of the magazine away from the pipe receiving location.

The apparatus further comprises a selection member for receiving pipes discharged from the lower ends of the plurality of columns. The selection member has a plurality of pipe receiving pockets that align with the lower end of the plurality of pipe columns when the selection member is in a first position. Pipes can then be discharged from the lower ends of the columns into the respective pipe receiving pockets of the selection member. The selection member is then transposed to a second position located towards the machine with a pipe receiving location.

The apparatus further comprises a pick-and-place device for picking a pipe from the first pocket when the selection member is in the second position. The pick-and-place device then places the picked pipe into the pipe receiving location. The apparatus can also work in reverse, picking a pipe from the pipe receiving location and placing the pipe into the first pipe receiving pocket when the selection member is in the second position.

BRIEF DESCRIPTION OF THE DRAWINGS

FIGS. 1A–F are sequential end elevation views of a directional boring machine incorporating an apparatus for loading pipe according to the present invention wherein a pipe is removed from the magazine and loaded into a pipe receiving location on the boring machine wherein;

FIG. 1A is an end elevation view wherein a selection member is in a second position such that a first pipe receiving pocket is moved towards the pipe receiving location;

FIG. 1B is the view of FIG. 1A wherein the pick-and-place device is positioning a pipe in the pipe receiving location on a boring machine;

FIG. 1C is the view of FIG. 1A showing the pick-and-place lever arm returning towards the selection member;

FIG. 1D is the view of FIG. 1A wherein pipes within the magazine and the selection member are elevated;

FIG. 1E is the view of FIG. 1A wherein the selection member is returned to a first position such that the first pipe receiving pocket is aligned with the lower end of a first column of pipes;

FIG. 1F is the view of FIG. 1A showing the pipes within the magazine lowered resulting in a bottom row of pipes lowered into the pipe receiving pockets of the selection member;

FIGS. 2A–F are sequential end elevation views wherein the present invention retrieves a pipe from the boring machine and returns the pipe to the magazine wherein;

FIG. 2A is an end elevation view wherein the selection member is in the second position shown in FIG. 1D wherein no pipe is in the first pipe receiving pocket and wherein the pipes within the magazine are elevated and wherein a pipe resides in the pipe receiving location of the boring machine;

FIG. 2B is the view of FIG. 2A wherein the pick-and-place device is rotated towards the pipe held by the boring machine;

FIG. 2C is the view of FIG. 2A wherein the pick-and-place device carries a pipe towards the selection member depositing the pipe in the first receiving pocket;

FIG. 2D is the view of FIG. 2A wherein the pipes within the magazine are lowered such that the bottom row of pipes are lowered from the magazine into the pipe receiving pockets of the selection member;

FIG. 2E is the view of FIG. 2A wherein the selection member is in a first position;

FIG. 2F is the view of FIG. 2A wherein the pipes are pushed up from the pipe receiving pockets into the magazine columns;

FIGS. 3A and B are side elevation views of the apparatus for loading pipe according to the present invention showing a lift-up arm wherein;

FIG. 3A is a side elevation view showing the lift-up arm pushing the bottom row of pipes into the magazine columns from the pipe receiving pockets of the selection member and;

DETAILED DESCRIPTION OF A PREFERRED EMBODIMENT

A. Structure of the Invention

Figure 1B:
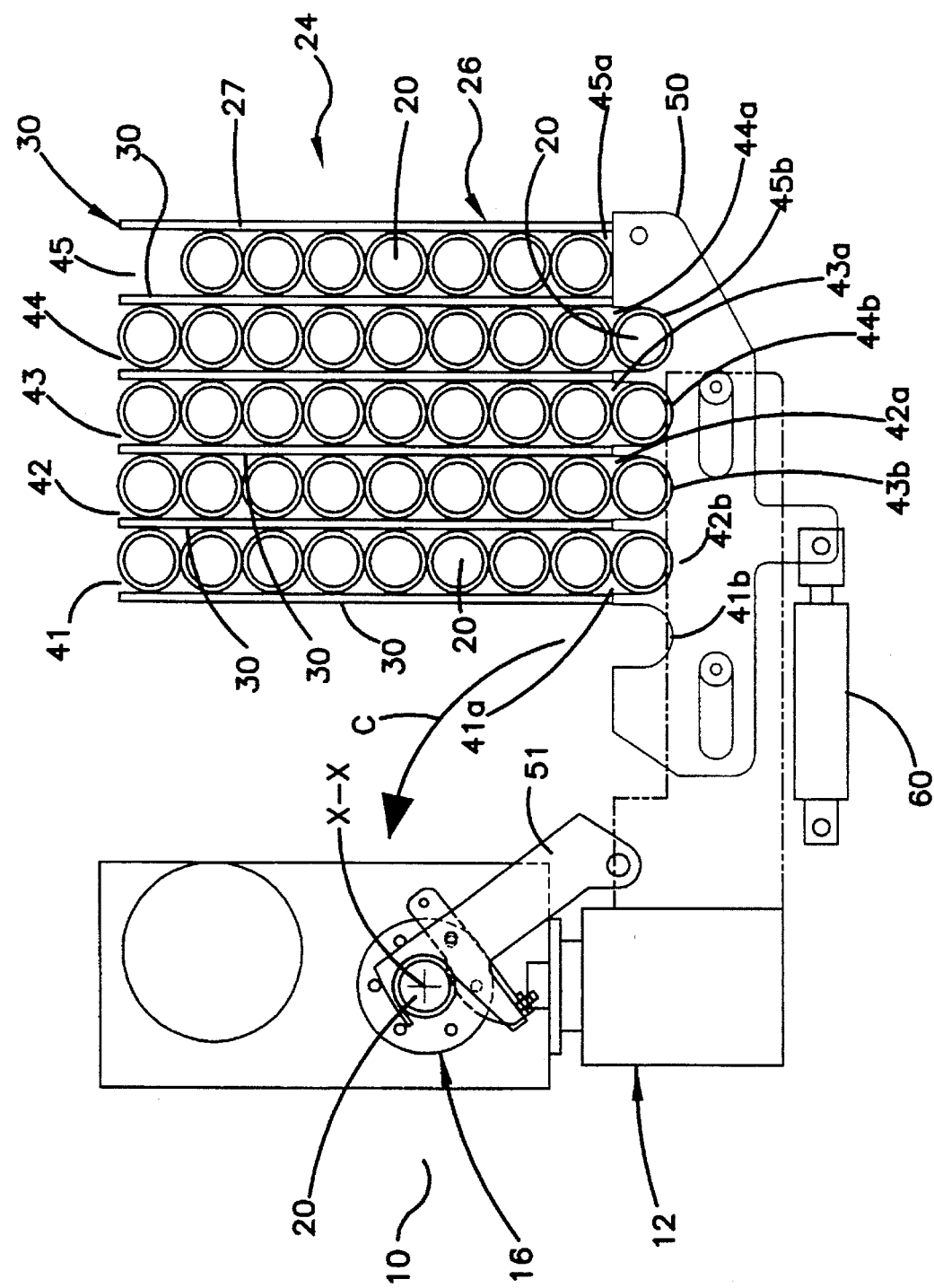

With reference to the figures in which elements are numbered identically throughout, a description of the preferred embodiment of the present invention will now be provided. The present invention can be used to load pipes onto any machine with a pipe receiving location. However, the invention will be described with reference to a pipeloading device for use in an underground boring machine 10.

Although not essential for a complete understanding of the present invention, a brief description of the boring machine 10 will be provided for ease of illustration. The boring machine 10 includes a frame 12 with a drive 16 for advancing and threading pipe together. The pipes are positioned in a pipe receiving location with a pipe axis X—X aligned with an axis X—X of the drive 16. In the past, a worker would manually lift a pipe and position the pipe in the boring machine 10.

The present invention is directed to an apparatus 24 for loading pipe onto a machine. The apparatus includes a magazine 26 containing a plurality of pipes 20. The magazine 26 includes a box-shaped frame 27 having a plurality of dividing walls 30. The walls 30 divide the magazine 26 into a plurality of columns 41–45. The column 41 nearest the boring machine 10 is conveniently referred to as a first column. The column 45 farthest from the boring machine is referred to as an end column. Each of the columns 41–45 contain a plurality of pipes 20 with the pipes aligned vertically within each of columns 41–45 and with the pipe axes parallel to the axis X—X of the drive 16. The columns 41–45 are provided with a width approximately equal to the width of a pipe 20.

In the example shown, the magazine 26 has five columns containing up to nine pipes each. It will be appreciated that magazine 26 can be provided with more or fewer columns and with more or fewer pipes per column.

The bottom end of the magazine is open such that the space between walls 30 define a plurality of discharge openings 41a–45a. In a preferred embodiment, the pipes 20 are gravity discharged through openings 41a–45a.

The present invention further comprises a selection member 50, in the form of a plate, having a plurality of pipe receiving pockets 41b–45b equal in number to the columns 41–45 present in the magazine. In the example shown, there are five columns, therefore, there are five pipe receiving pockets. It will be appreciated that when magazine 26 is provided with more or fewer columns 41–45, the number of pipe receiving pockets 41b–45b will increase or decrease correspondingly.

The present invention further comprises a shifting means 60, in the form of a hydraulic cylinder, for transposing the selection member 50. The selection member can be in a first position, as in FIG. 1E, wherein a first pipe receiving pocket 41b of the selection member 50 is aligned with the opening 41a at the bottom end of a first column 41. Alternatively, the selection member can be in a second position, as in FIG. 1A, wherein the first pipe receiving pocket 41b is transposed one column width towards the boring machine 10. During shifting, the selection member 50 moves in a path of travel perpendicular to the axis X—X as indicated by arrows A and B in FIGS. 1A, 1E, 2A and 2E.

The present invention further comprises a pick-and-place lever arm 51 for picking a pipe 20 from the first pipe receiving pocket 41b when the selection member 50 is in the second position, as in FIG. 1A. After the pick-and-place lever arm 51 picks a pipe 20 from the first pipe receiving pocket 41b, the pick-and-place lever arm 51 transports the pipe 20 in an arcuate path (arrow C in FIG. 1B) towards the boring machine 10.

Figure 3A:
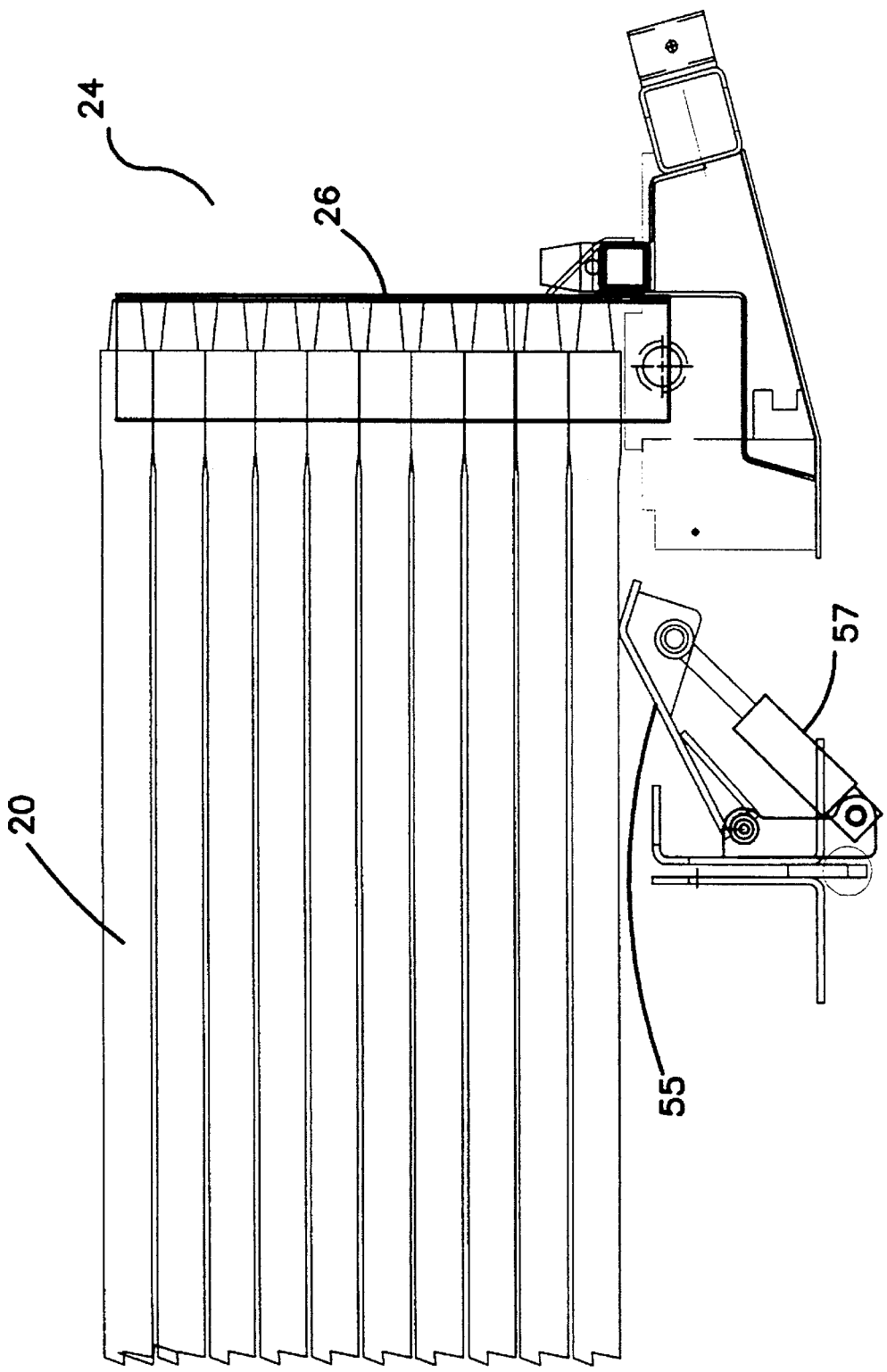
Figure 3B:
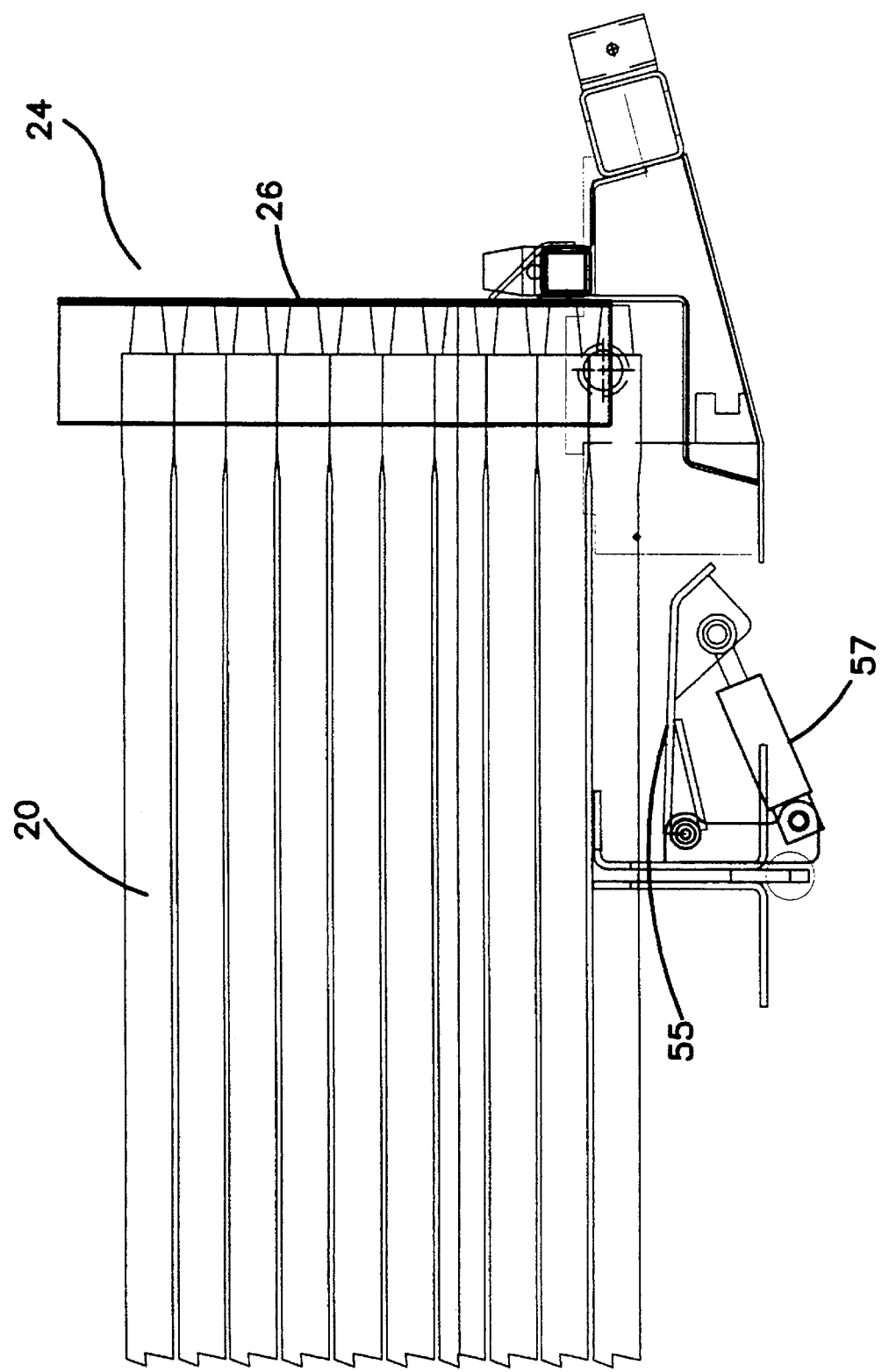
FIG. 3B is the view of FIG. 3A showing the lift up arm returning the bottom row of pipes to the pipe receiving pockets of the selection member.

The invention further comprises a lift-up arm 55, shown in FIGS. 3A and 3B, for selectively supporting the pipes 20 within the magazine 26. The arm 55 forms a plate beneath the magazine 26 which spans the width of magazine 26. The arm 55 is pushed up or down by a hydraulic cylinder 57. The lift up arm 55 can be in a first position, as shown in FIG. 3B, wherein the bottom row of pipes 20 rest in the pipe receiving pockets 41b–45b of the selection member 50 and the arm 55 is beneath the pockets. Alternatively, the lift up arm 55 can be in a second position (FIG. 3A) whereby the arm 55 pushes the pipes 20 up from the pipe receiving pockets 41b–45b into the columns 41–45 of the magazine 26.

With the structure of the invention thus described, the operation of the invention can now be appreciated with reference to FIGS. 1–3.

B. Operation of the Invention

1. Placing a Pipe in the Boring Machine

FIGS. 1A–F sequentially demonstrate how the components of the apparatus described interact to remove a pipe 20 from the magazine 26 and position the pipe 20 for use with a boring machine 10.

In FIG. 1A, the selection member 50 is in a second position wherein the first pipe receiving pocket 41b is transposed one column width towards the boring machine 10. The pick-and-place lever arm 51 is disposed to receive a pipe 20 from the first pipe receiving pocket 41b. The lift up arm 55 is down and away from the magazine 26 (FIG. 3B) such that the bottom row of pipes 20 in columns 41–44 rest in pipe receiving pockets 42b–45b.

In FIG. 1B, the pick-and-place lever arm 51 removes the pipe 20 from the first pipe receiving pocket 41b and positions the pipe 20 for use with the boring machine 10. The pick-and-place lever arm rotates in an arcuate path towards the boring machine 10 and aligns the pipe 20 with the axis X—X of drive 16 for advancing and threading the pipes together.

Figure 1C:
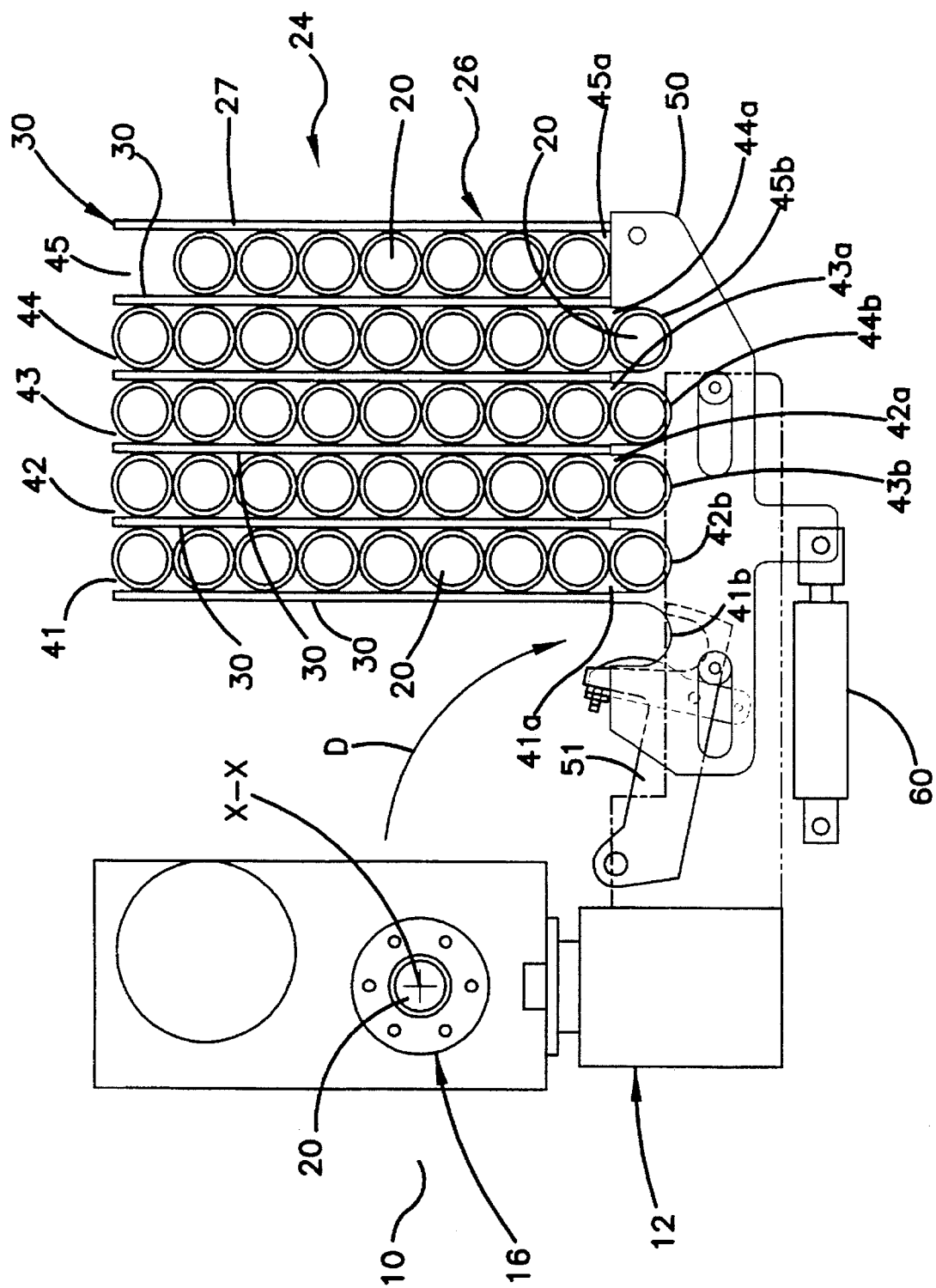

FIG. 1C shows the pick-and-place lever arm 51 rotating (in the direction of arrow D) in an arcuate path towards the selection member 50 to return to the position it held in FIG. 1A.

Figure 1D:
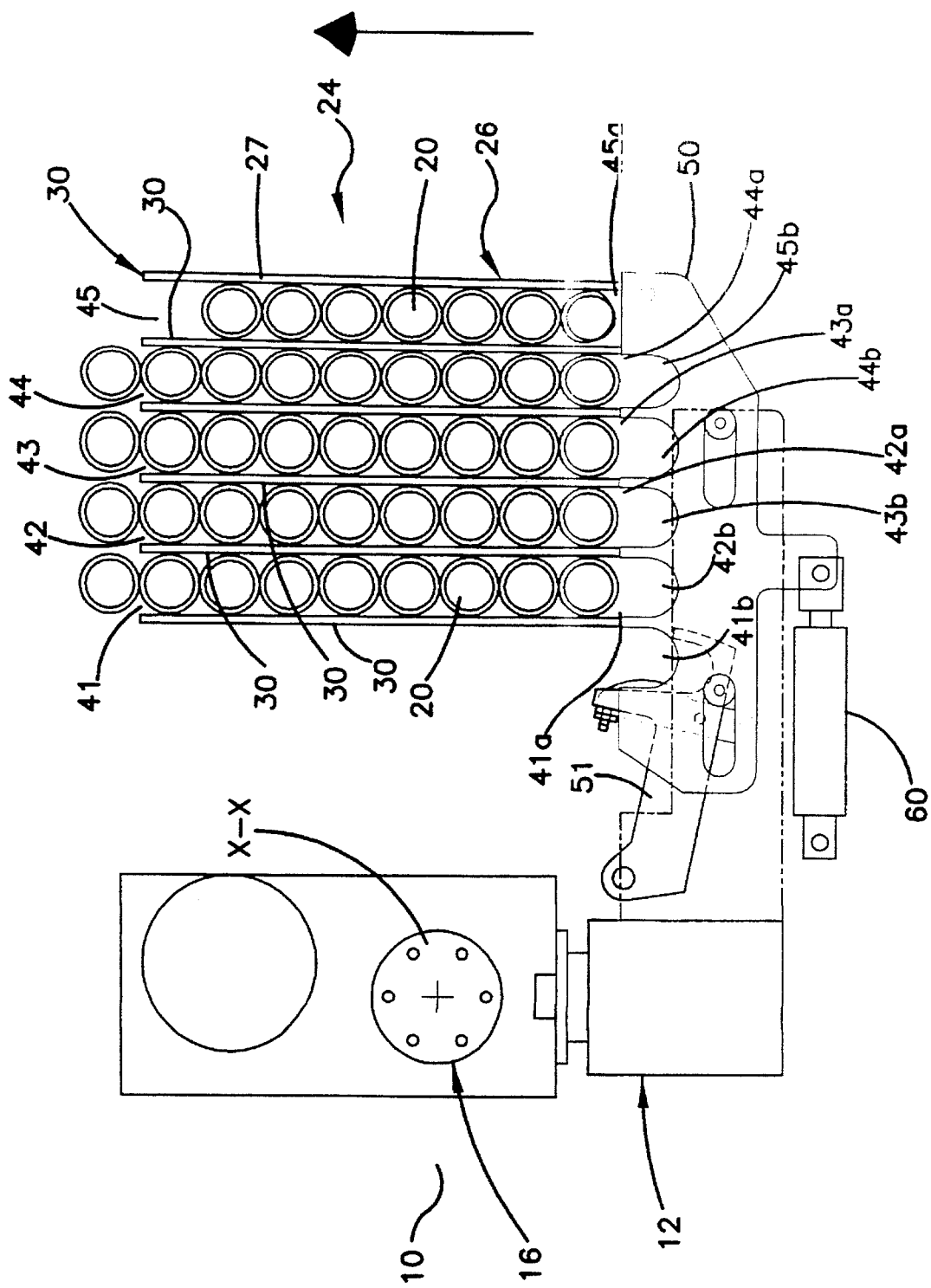

In FIG. 1D, the lift-up arm 55 is moved to a second position (FIG. 3A) wherein the bottom row of pipes 20 are pushed up from the pipe receiving pockets 42b–45b into the magazine columns 41–44. The bottom row of pipes 20 is now positioned above the pipe receiving pockets 42b–45b.

Figure 1E:
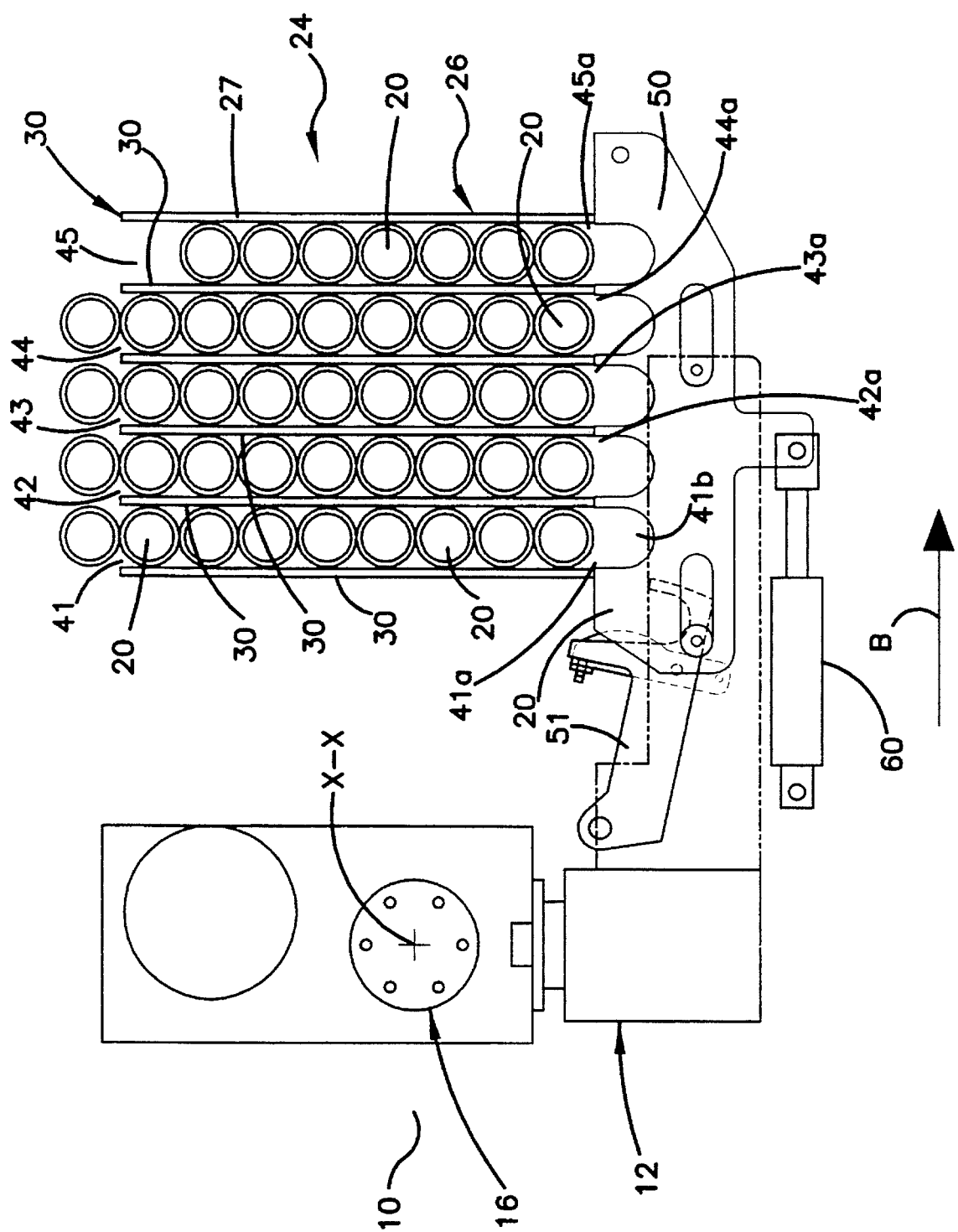

In FIG. 1E, the shifting means 60 for moving the selection member 50 transposes said selection member 50 (in the direction of arrow B) to a first position, wherein the first pipe receiving pocket 41b is aligned with a first column 41 of pipes 20 present in the magazine 26.

Figure 1F:
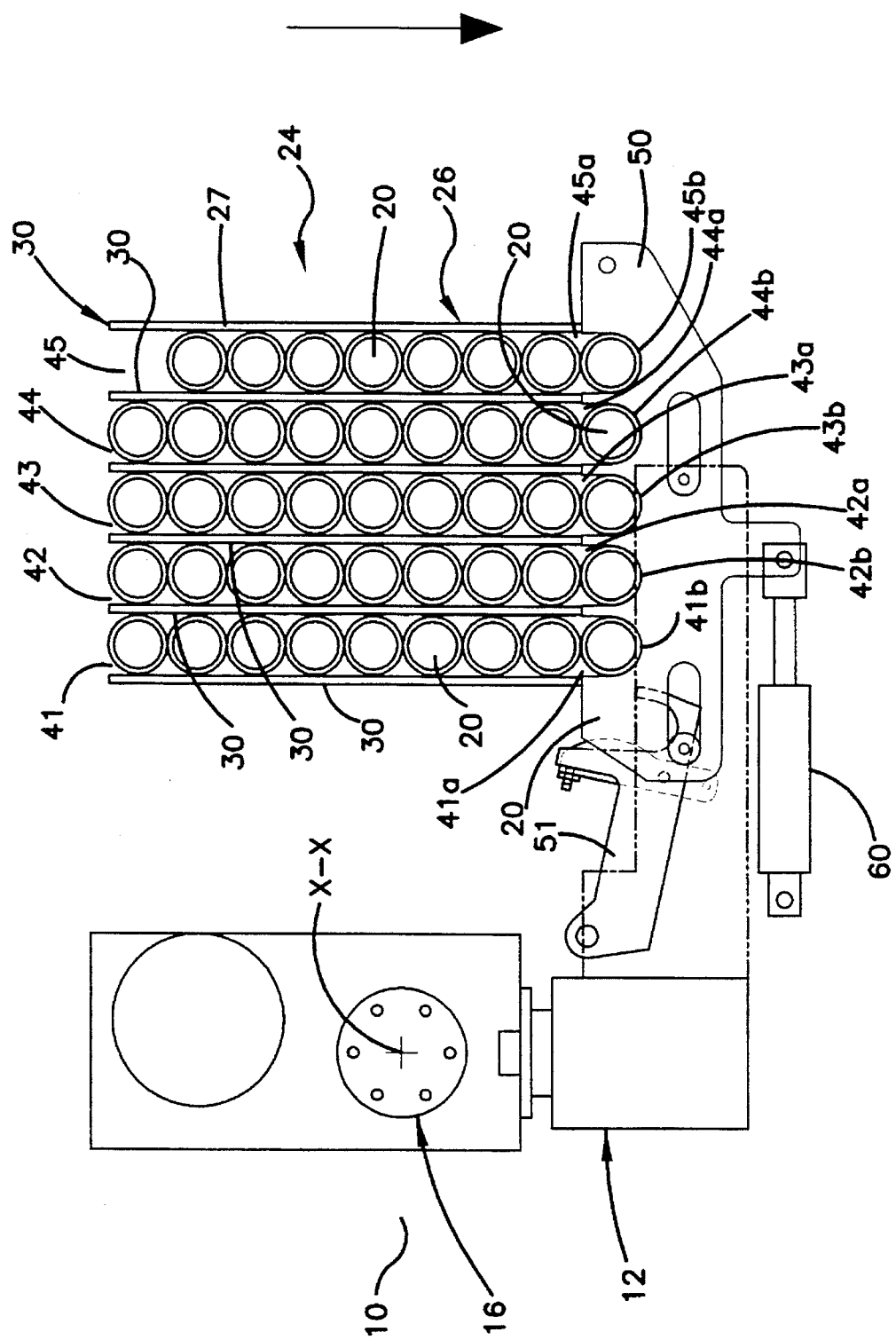

In FIG. 1F, the lift-up arm 55 is moved to a first position (FIG. 3B), wherein said lift up arm is moved downwardly and away from the magazine 26. The bottom row of pipes 20 in columns 41–45 now have unobstructed access to the pipe receiving pockets 41b–45b. Therefore, the bottom row of pipes 20 are displaced, by gravity, from the magazine 26 into the pipe receiving pockets 41b–45b.

Once pipes 20 are in the pipe receiving pockets 41–45, the selection member 50 can be displaced one column width towards the boring machine 10 (i.e. moved in the direction of arrow A to the position shown in FIG. 1A) and the process can begin again. In this process, the pipes in the end column 45, farthest from the boring machine 10, are used first and the pipes in the first column 41, nearest the boring machine, are used last.

2. Removing Pipe From the Boring Machine

FIGS. 2A–2F are sequential end elevation views demonstrating how the components of the present invention interact to unload pipes 20 from a boring machine 10 to the magazine 26.

Figure 2A:
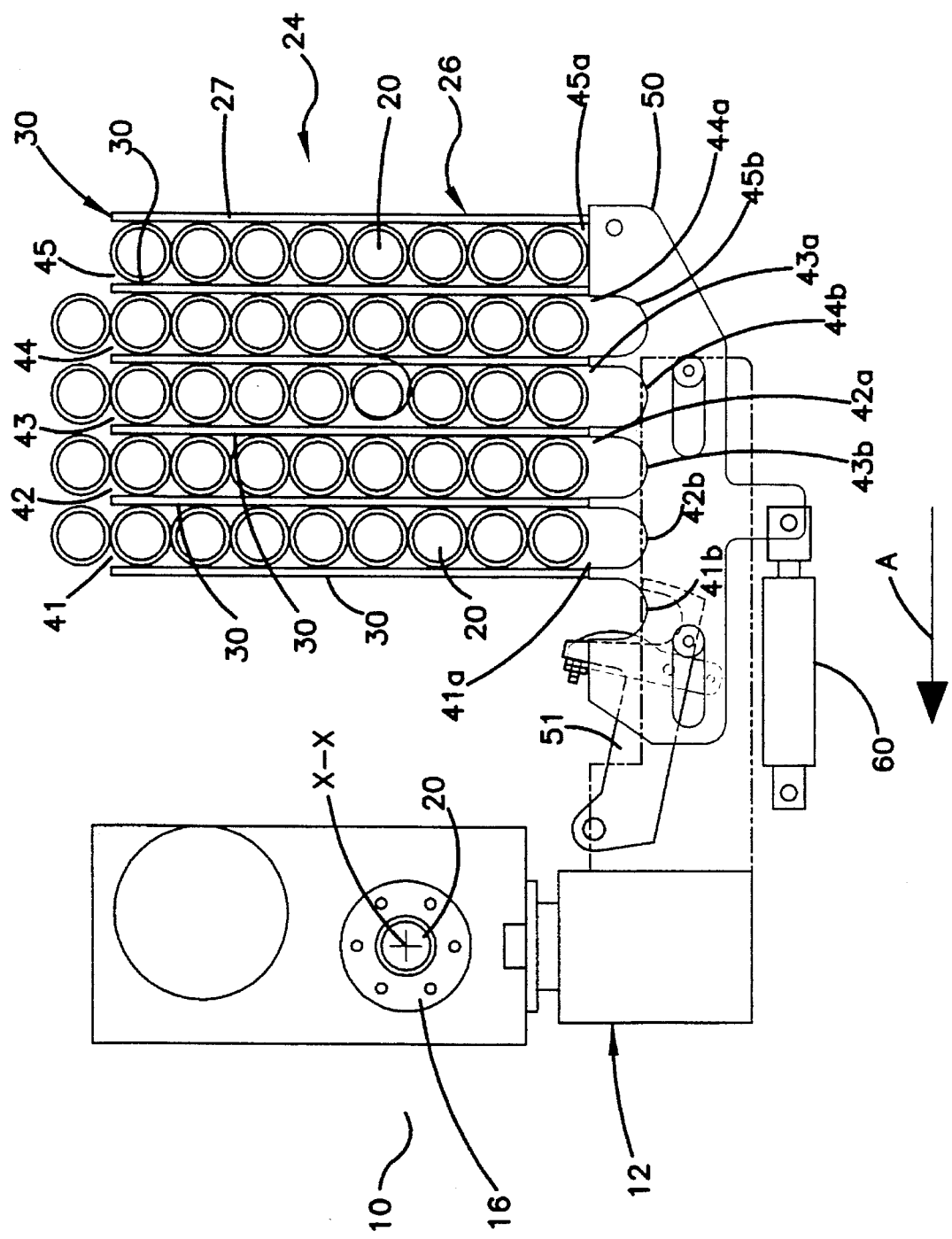

In FIG. 2A, the selection member 50 is in the second position wherein the first pipe receiving pocket 41b is transposed one column width towards the boring machine 10. A pipe 20 is positioned in the pipe receiving position of the drive 16. The empty pick-and-place lever arm 51 is rotated towards the selection member 50. The lift-up arm 55 is in a second position (FIG. 3A) wherein the lift-up arm pushes the bottom row of pipes 20 from the pipe receiving pockets 42b–45b into the columns 41–44 aligned above the corresponding pipe receiving pockets 42b–45b.

Figure 2B:
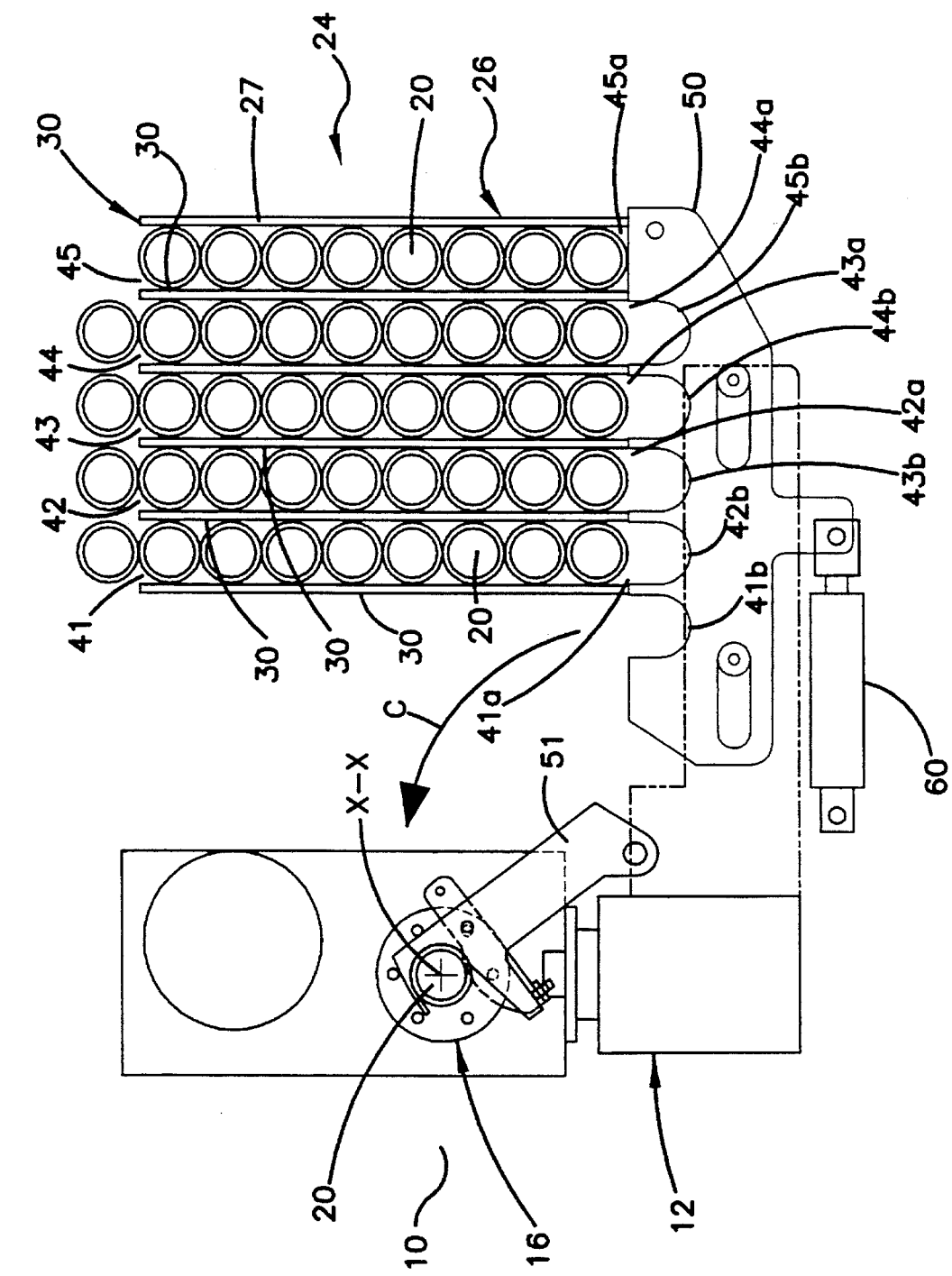

In FIG. 2B, the empty pick-and-place lever arm 51 rotates (in the direction of arrow C) towards the boring machine 10. The lift-up arm 55 remains in the second position and the selection member 50 also remains in a second position.

Figure 2C:
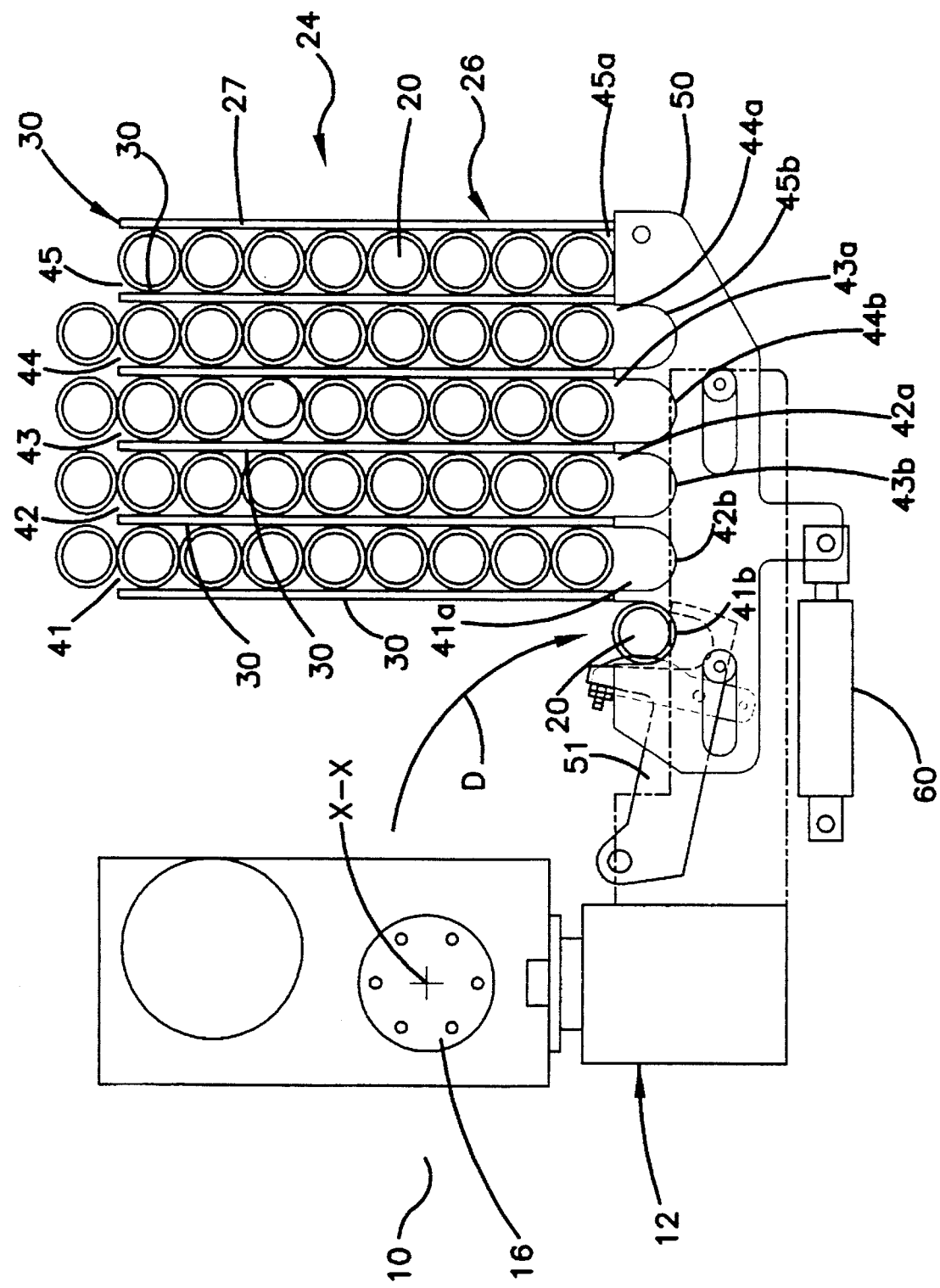

In FIG. 2C, the pick-and-place lever arm 51 removes the pipe from the boring machine 10 and rotates (in the direction of arrow D) towards the selection member 50 thereby placing the pipe 20 into the first pipe receiving pocket 41b.

Figure 2D:
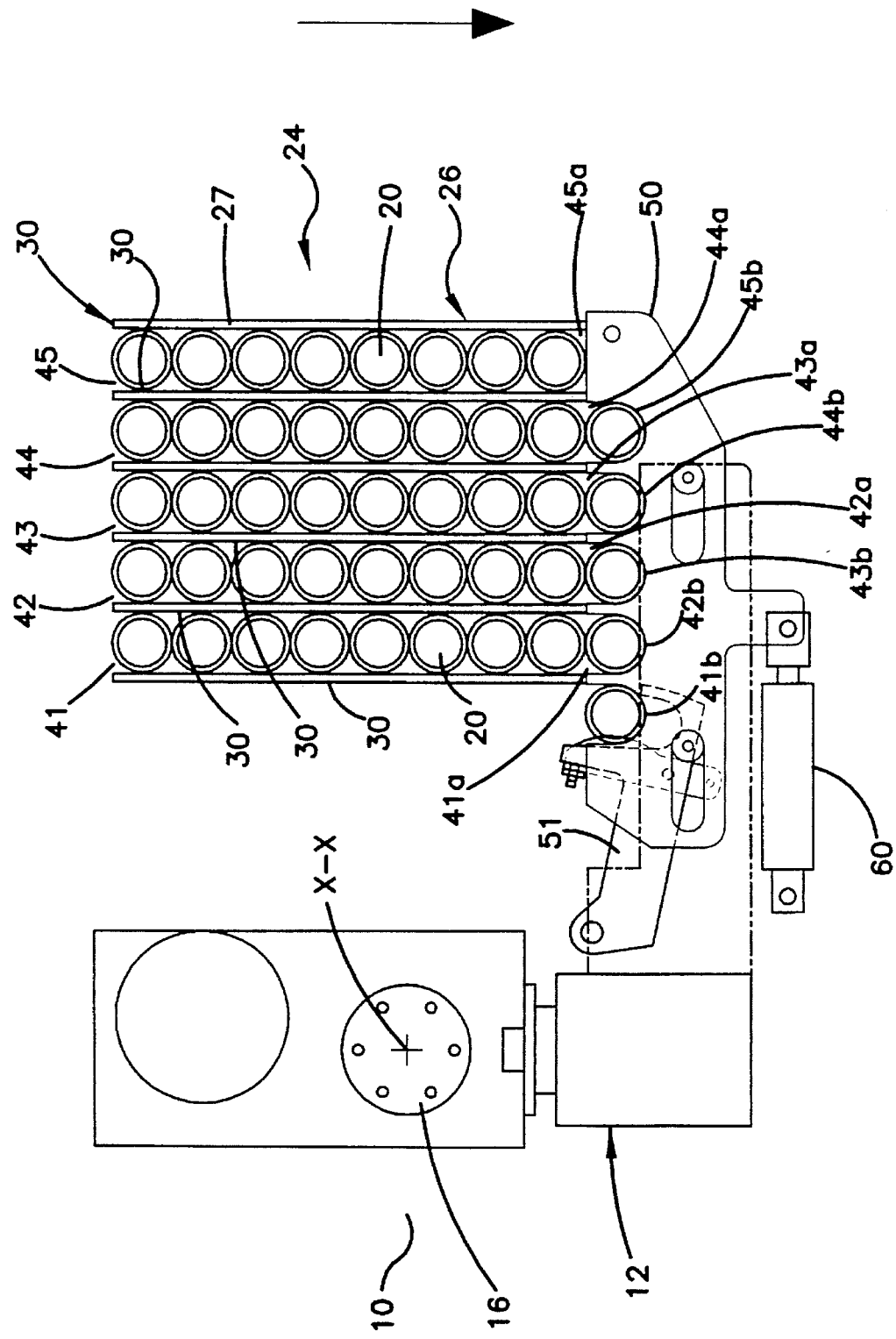

In FIG. 2D, the lift-up arm 55 returns to a first position (FIG. 3B) such that the bottom row of pipes in columns 41–44 move, via gravity, into the pipe receiving pockets 42b–45b positioned below the columns 41–44.

Figure 2E:
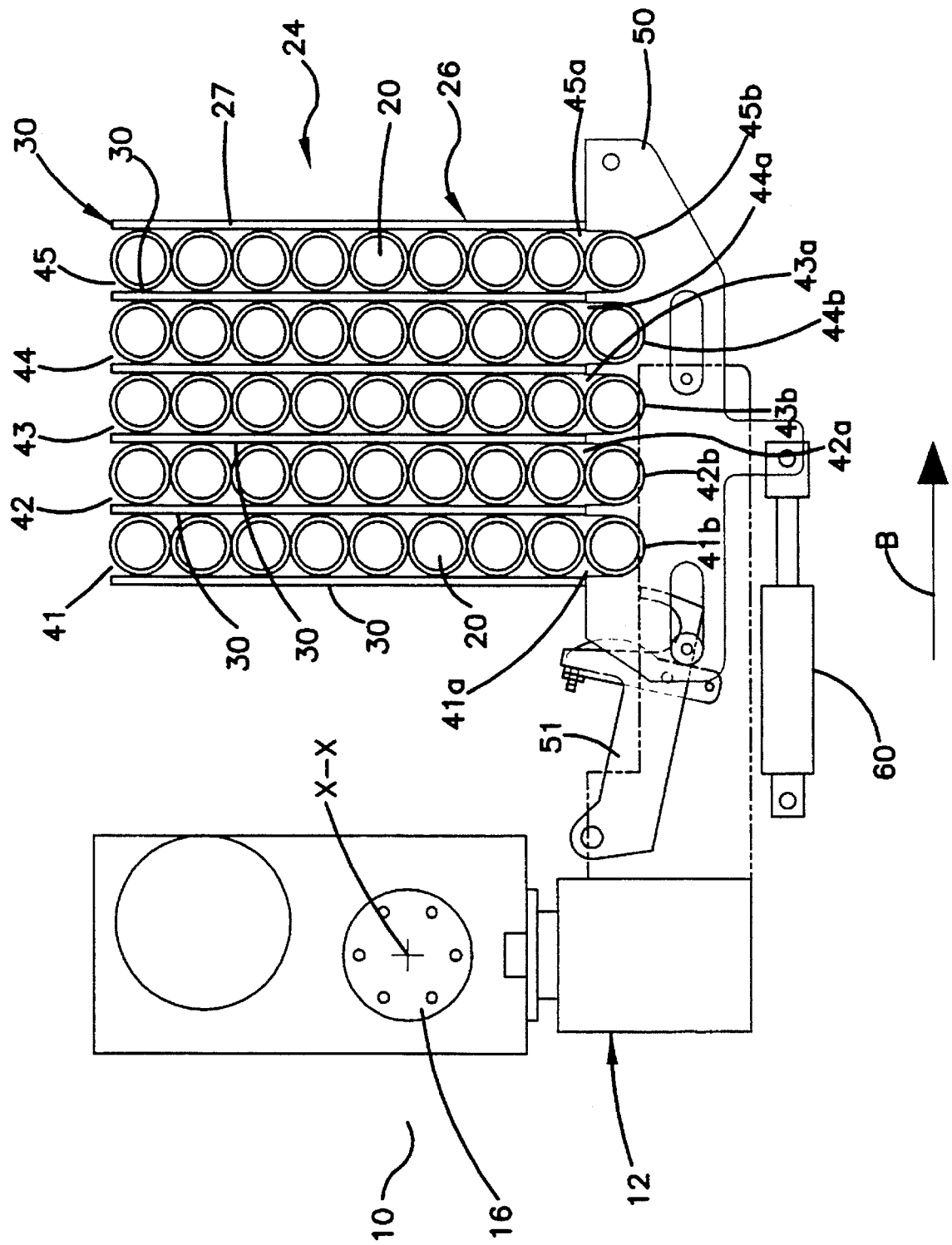

In FIG. 2E, the shifting means 60 transposes the selection member 50 in the direction of arrow B back to a first position. As a result, the first pipe receiving pocket 41b is aligned with the first column 41 of the magazine 26. Additionally, the pipe receiving pockets 42b–45b are aligned with columns 42–45, respectively.

Figure 2F:
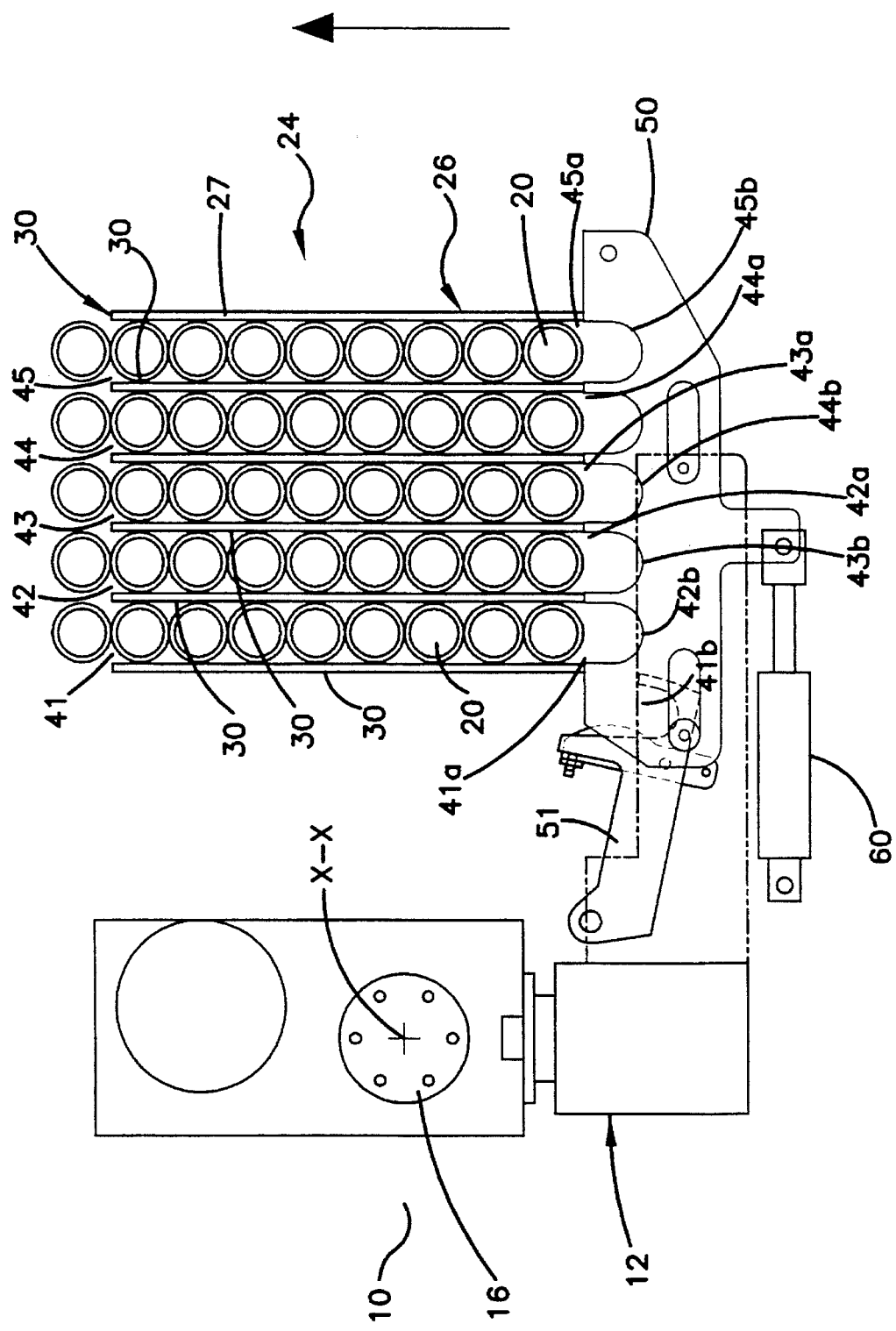

In FIG. 2F, the lift-up arm 55 is moved upwardly to a second position (FIG. 3A). The lift-up arm 55 pushes up the bottom row of pipes 20, and consequently, all pipes 20 in the magazine 26, up from the pipe receiving pockets 41b–45b into the columns 41–45 of the magazine 26.

The selection member 50 is then transposed back into a second position (by movement in the direction of arrow A to the position shown in FIG. 2A), wherein the pipe receiving pockets 41–45 are empty and the first pipe receiving pocket 41 is transposed one column width towards the boring machine 10. The apparatus is then ready to transfer another pipe from the boring machine 10 to the magazine 26. In this process, the pipes 20 are replaced in the end column 45 first. These pipes are the pipes that were added from the columns nearer the boring machine 10, such as the first column 41, when the bore was being formed. In this manner, the apparatus rotates the positions of the pipes 20 within the magazine 26 and thereby insures that the pipes will wear evenly.

When unloading pipe from the machine 10, the last column 45 will become full such that it is undesirable to add additional pipe 20 to the last column 45. Addition of additional pipe to the last column can easily be prevented by plugging pocket 45b with a suitable plug (not shown). Such plugging will prevent pipe from being transported to the last column 45. After the last column 45 is full, the second to the last column 44 can then be filled with pipe as described above. When this column 44 is full, pocket 44b may then be plugged to prevent additional pipe from being placed in column 44. This procedure may be repeated for columns 43, 42 by plugging pockets 43b, 42b, respectively.

It is to be understood that the present invention is not limited to the particular construction and arrangement of parts disclosed and illustrated herein, but embraces all such modified forms thereof as come within the scope of the following claims.

What is claimed is:

1. An apparatus for loading pipe onto a machine having a pipe receiving location, said apparatus comprising:

a source of a plurality of pipes disposed in a plurality of columns each terminating at a lower end with a pipe within each of said columns dischargeable through said lower end of a respective column, said plurality of columns including a first column disposed in close proximity to said pipe receiving location and an end column disposed on a side of said source away from said pipe receiving location;

a selection member for receiving a pipe from said lower ends and transporting said pipe along a path of travel at least toward said pipe receiving location;

said selection member including a plurality of pipe receiving pockets positioned to align with individual ones of said lower ends for said pipes to be discharged from said lower ends into respective ones of said pockets when said selection member is in any one of at least a first and a second position;

said plurality of pockets including a first pocket positioned to be aligned with said lower end of said first column when said selection member is in said first position and located adjacent said pipe receiving location when said selection member is in said second position;

a pick-and-place device for picking a pipe from said first pocket when said selection member is in said second position and placing said picked pipe into said pipe receiving location.

2. An apparatus according to claim 1 wherein said pipes are positioned within said columns for gravity discharge through said lower ends and wherein said apparatus further comprises a lift for selectively supporting said pipes within said source from passing through said lower ends.

3. An apparatus according to claim 2 wherein said lift assumes one of at least a first and second lift position at a selection of an operator;

in said first lift position, said lift is moved away from said source to provide unobstructed gravity feed from said columns to said pipe receiving pockets;

in said second lift position, said lift is moved to urge pipe from said pipe receiving pockets into aligned ones of said columns.

4. An apparatus according to claim 1 wherein said pipes in said source and in said pipe receiving pockets are disposed in parallel alignment with said pipe receiving location.

5. An apparatus according to claim 1 wherein said pipe in said first receiving pocket is presented with an unobstructed pathway from said second position to said pipe receiving location.

6. A method for loading pipe onto a machine having a pipe receiving location wherein said machine includes a source containing a plurality of pipes disposed in a plurality of columns wherein each column terminates at a lower end with a pipe dischargeable through said lower end and wherein said plurality of columns includes a first column disposed in close proximity to said pipe receiving location and an end column disposed on a side of said source away from said pipe receiving location, said method comprising:

lowering said pipes through said lower ends of each column into pipe receiving pockets of a selection member;

shifting said selection member from a first position aligned with said source to a second position wherein said selection member is located adjacent said pipe receiving location;

removing a pipe from said selection member using a pick-and-place device;

placing said picked pipe into said pipe receiving location of said machine.

7. A method for returning pipe from a machine having a pipe receiving location to a source containing a plurality of pipes disposed in a plurality of columns wherein each column terminates at a lower end with a pipe dischargeable through said lower end and wherein said plurality of columns includes a first column disposed in close proximity to said pipe receiving location and an end column disposed on a side of said source away from said pipe receiving location, said method comprising:

removing a pipe from said machine having said pipe receiving location using a pick-and-place device;

placing said removed pipe into a selection member having pipe receiving pockets;

shifting said selection member from a second position wherein said selection member is located adjacent said pipe receiving location to a first position wherein said selection member is aligned with said source;

pushing said pipes up from said selection member into said source.

8. The method according to claims 6 or 7, wherein a first pocket of said selection member is aligned with a lower end of said first column when said selection member is in said first position.

9. The method according to claim 6, wherein said picked pipe is removed from a first pipe receiving pocket of said selection member.

10. The method according to claim 7, wherein said removed pipe is placed in a first pipe receiving pocket of said selection member.

11. The method according to claim 6 wherein a pipe is moved from a column on a side of said source away from said pipe receiving location to a column located towards said pipe receiving location.

12. The method according to claim 7 wherein a pipe is moved from a column on a side of said source located towards said pipe receiving location to a column away from said pipe receiving location.

13. The method according to claim 6 wherein said pipes are gravity discharged through said lower ends of said columns.

14. The method according to claims 6 or 7 wherein the pipes are selectively supported within said source.

15. The method according to claim 14 wherein said pipes are selectively supported by a lift-up arm.

16. The method according to claim 15 wherein said lift-up arm assumes one of at least a first and second lift position at a selection of an operator;

in said first lift position, said lift is moved away from said source to provide unobstructed gravity feed from said columns to said pipe receiving pockets;

in said second lift position, said lift is moved to urge pipe from said pipe receiving pockets into aligned ones of said columns.

* * * * *